(12) United States Patent
Mittal

(10) Patent No.: US 10,102,274 B2
(45) Date of Patent: Oct. 16, 2018

(54) CORPUS SEARCH SYSTEMS AND METHODS

(71) Applicant: NLPCore LLC, Seattle, WA (US)

(72) Inventor: Varun Mittal, Faridabad (IN)

(73) Assignee: NLPCore LLC, Seattle, WA (US)

( * ) Notice: Subject to any disclaimer, the term of this patent is extended or adjusted under 35 U.S.C. 154(b) by 598 days.

(21) Appl. No.: 14/216,059

(22) Filed: Mar. 17, 2014

(65) Prior Publication Data

US 2015/0261850 A1    Sep. 17, 2015

(51) Int. Cl.
*G06F 17/30* (2006.01)

(52) U.S. Cl.
CPC .. *G06F 17/30684* (2013.01); *G06F 17/30598* (2013.01); *G06F 17/3053* (2013.01)

(58) Field of Classification Search
CPC ........... G06F 17/3053; G06F 17/30598; G06F 17/30684
USPC ........................................................ 707/724
See application file for complete search history.

(56) References Cited

U.S. PATENT DOCUMENTS

| | | | | |
|---|---|---|---|---|
| 5,265,065 A * | 11/1993 | Turtle | ............... | G06F 17/30011 |
| 5,488,725 A * | 1/1996 | Turtle | ............... | G06F 17/30011 |
| 5,696,962 A * | 12/1997 | Kupiec | ............. | G06F 17/30672 |
| 7,702,665 B2 * | 4/2010 | Huet | ................. | G06F 17/30684 |
| | | | | 707/602 |
| 7,890,521 B1 * | 2/2011 | Grushetskyy | ..... | G06F 17/30867 |
| | | | | 704/10 |
| 9,195,640 B1 * | 11/2015 | Donneau-Golencer | ...................... | |
| | | | | G06F 17/28 |
| 9,639,524 B2 * | 5/2017 | Allen | ...................... | G06F 17/28 |
| 2004/0006459 A1 * | 1/2004 | Dehlinger | ............... | G06F 17/27 |
| | | | | 704/10 |
| 2004/0054520 A1 * | 3/2004 | Dehlinger | ........... | G06F 17/2715 |
| | | | | 704/5 |
| 2004/0059565 A1 * | 3/2004 | Dehlinger | ........... | G06F 17/2715 |
| | | | | 704/5 |
| 2005/0120011 A1 * | 6/2005 | Dehlinger | ........... | G06F 17/2705 |
| 2005/0198026 A1 * | 9/2005 | Dehlinger | ............. | G06F 17/277 |
| 2008/0141117 A1 * | 6/2008 | King | ................. | G06F 17/30011 |
| | | | | 715/238 |
| 2008/0189269 A1 * | 8/2008 | Olsen | ................ | G06F 17/30864 |
| 2008/0313202 A1 * | 12/2008 | Kamen | ............. | G06F 17/30731 |
| 2010/0257159 A1 * | 10/2010 | Uematsu | ........... | G06F 17/30675 |
| | | | | 707/723 |
| 2013/0159348 A1 * | 6/2013 | Mills | ................ | G06F 17/30705 |
| | | | | 707/777 |
| 2013/0226939 A1 * | 8/2013 | Wilkinson | ........ | G06F 17/30648 |
| | | | | 707/754 |

(Continued)

*Primary Examiner* — Pierre M Vital
(74) *Attorney, Agent, or Firm* — Aeon Law, PLLC; Adam L. K. Philipp; David V. H. Cohen

(57) ABSTRACT

A corpus of texts relating to a domain of knowledge may be searched by determining noun-pair proximity scores measuring associations between pairs of nouns that appear in the corpus and that are semantically related to the domain of knowledge. When a search term is received, the noun-pair proximity scores may be used (at least in part) to identify one or more related nouns that are strongly associated with the search term within the corpus. One or more texts may be selected from the corpus, texts in which the search term and the related nouns appear near each other in one or more places. The selected texts may be categorized and/or clustered based on the related nouns before being returned for presentation as SearchResults.

18 Claims, 11 Drawing Sheets

(56) References Cited

U.S. PATENT DOCUMENTS

| | | | |
|---|---|---|---|
| 2014/0229159 A1* | 8/2014 | Branton | G06F 17/30719 704/9 |
| 2015/0135053 A1* | 5/2015 | Doornenbal | G06F 17/277 715/230 |

* cited by examiner

CORPUS SEARCH SYSTEMS AND METHODS

FIELD

This disclosure is directed to the field of software, and more particularly, to searching a corpus of texts relating to a domain of knowledge.

BACKGROUND

General-purpose search engines have become reasonably good at providing meaningful search results, particularly in domains of knowledge that are not highly technical and/or specialized. Some general-purpose search engines employ "semantic" search techniques in an attempt to improve search accuracy by understanding searcher intent and the contextual meaning of terms as they appear in the searchable dataspace. Generally, semantic search systems may consider various signals including context of search, location, intent, variation of words, synonyms, concept matching and natural language queries to provide relevant search results.

Many search engines, semantic or otherwise, use various Natural language processing ("NLP") techniques to perform operation such as tokenization, parsing, part-of-speech tagging, named entity recognition, and the like. While many existing NLP parsers do a reasonably good job at parsing "ordinary" texts in a given language, highly specialized and/or technical language is frequently misinterpreted by general-purpose parsers.

Because documents pertaining to many domains of knowledge frequently use specialized and/or technical language, existing NLP techniques (as well as the search engines that rely on them) often provide inaccurate and/or suboptimal results when searching across a specialized domain of knowledge.

DESCRIPTION

Figure 1:
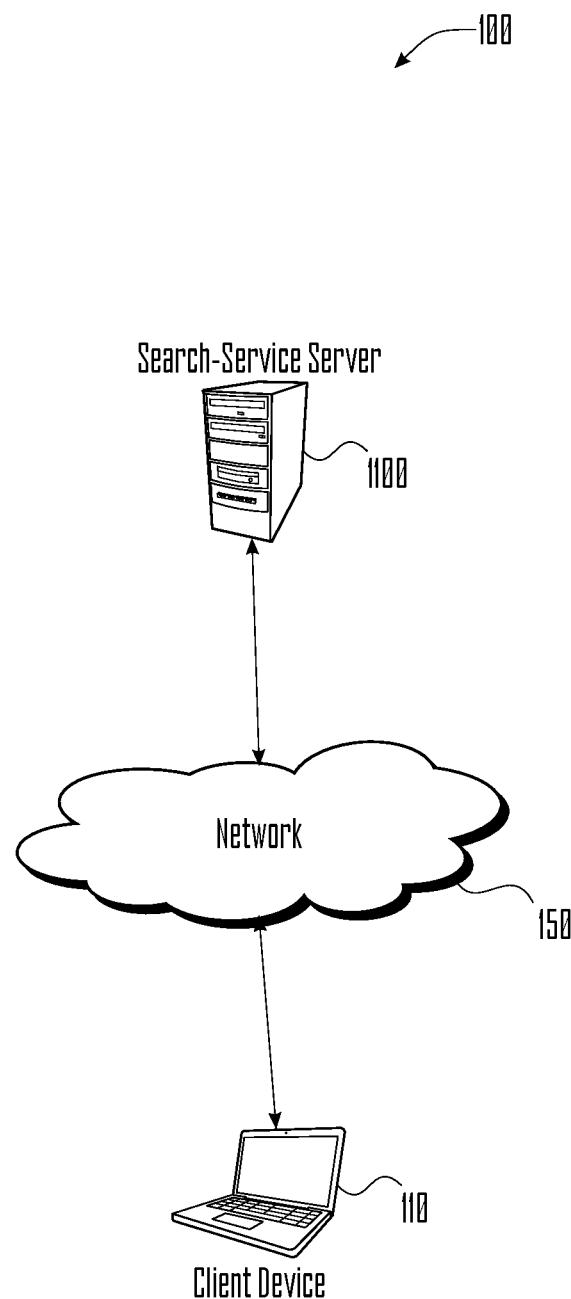
FIG. 1 illustrates a simplified search system in which search-service server and client device are connected to network.

In various embodiments, as described further herein, one or more domain-of-knowledge-specific heuristics may be used to improve the output of a general-purpose NLP parser when processing texts related to a particular domain of knowledge. Once key terms or entities in a text have been properly identified, each entity in a text may be placed in a statistical model variably linking it to other entities in the text based upon a measure of intra-clause proximity. In some embodiments, a user may validate the parsed data.

Such a statistical model measuring intra-clause proximity may subsequently be used to identify texts that are related to a search term and/or to cluster and/or categorize texts within a corpus. Relatedly, a statistical entities model may also be used to identify subjects and/or key concepts that are discussed in a text.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a simplified search system in which search-service server 1100 and client device 110 are connected to network 150.

Search-service server 1100 (see FIG. 11, discussed below) represents a provider of corpus-search services, such as described more fully below.

In various embodiments, network 150 may include the Internet, a local area network ("LAN"), a wide area network ("WAN"), and/or other data network.

In various embodiments, client device 110 may include desktop PCs, mobile phones, laptops, tablets, wearable computers, or other computing devices that are capable of connecting to network 150, sending search terms to search-service server 1100, and presenting search results, such as described herein.

In various embodiments, additional infrastructure (e.g., cell sites, routers, gateways, firewalls, and the like), as well as additional devices may be present. Further, in some embodiments, the functions described as being provided by some or all of search-service server 1100 may be implemented via various combinations of physical and/or logical devices.

For example, in one embodiment, search-service server 1100 may include and/or make use of a platform-as-a-service such as the Google App Engine, provided by Google Inc. of Menlo Park, Calif. In such an embodiment, the platform-as-a-service may provide a set of processing nodes that are scaled up/down based upon the number of texts in a queue. Once texts are processed (as described further below), the resulting search index may be stored in corpus-data database 1140, which may utilize the App Engine's BigTable. A front-end search interface may be built using a programming language supported by the platform-as-a-service (e.g., Python, Java, Go, or the like) to accesses results from the data store and display them to the user in tabular and/or graphical visualizations such as those shown in search-results user-interface 900 (see FIG. 9, discussed below), ResultsUITwoItem/_figbelow, and/or search-results user-interface 1000 (see FIG. 10, discussed below).

However, it is not necessary to show such infrastructure and implementation details in FIG. 1 in order to describe an illustrative embodiment.

Figure 2:
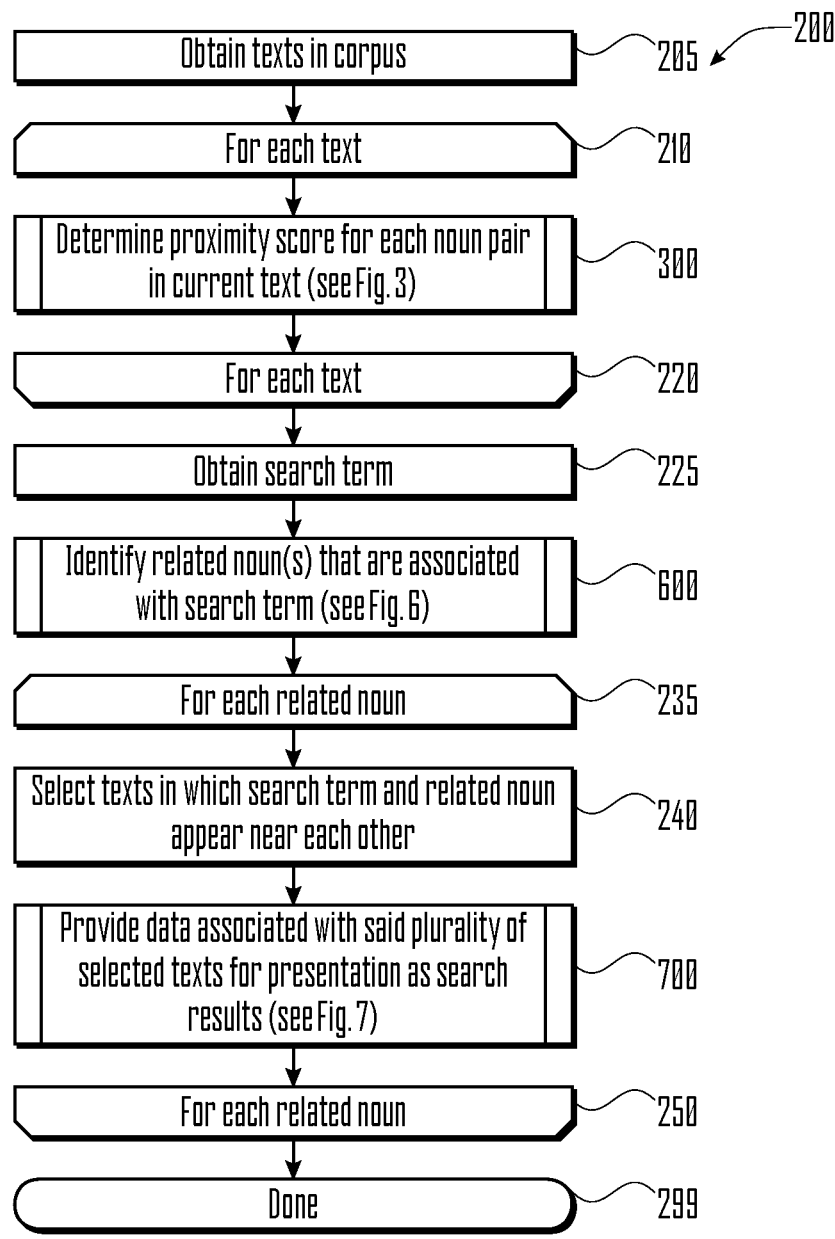
FIG. 2 illustrates a search routine for searching a corpus of texts relating to a domain of knowledge, such as may be performed by a search-service server in accordance with one embodiment.

FIG. 2 illustrates a search routine 200 for searching a corpus of texts relating to a domain of knowledge, such as may be performed by a search-service server 1100 in accordance with one embodiment.

In block 205, search routine 200 obtains the contents of a set of texts that make up a corpus directed to some domain of knowledge. For example, in one embodiment, which will be used as an example to illustrate various operations described below, search routine 200 may obtain the contents of a set of technical articles such as those included in the PubMed Central® ("PMC") archive of biomedical and life sciences journal literature at the U.S. National Institutes of Health's National Library of Medicine.

Beginning in opening loop block 210, search routine 200 processes each text in turn.

In subroutine block 300, search routine 200 calls subroutine 300 (see FIG. 3, discussed below) to determine a proximity score for each noun pair in the current text of the corpus. Generally, a proximity score measures associations between a pair of nouns that appear in the current text and that are semantically related to the domain of knowledge. Proximity scores, their significance, and their uses, are described in further detail below.

In ending loop block 220, search routine 200 iterates back to opening loop block 210 to process the next text, if any.

After each text of the corpus has been processed, in block 225, search routine 200 obtains a search term, e.g, from client device 110, related to a domain of knowledge. For example, in an example embodiment based on a corpus of texts from the PMC archive, search routine 200 may obtain a search term such as "malaria" (a type of disease), "*culex*" (a genus of mosquito), or the like.

In subroutine block 600, search routine 200 calls subroutine 600 (see FIG. 6, discussed below) to identify, based at least in part on a multiplicity of noun-pair proximity scores, one or more related nouns that are strongly associated with the search term within a corpus. For example, in an example embodiment based on a corpus of texts from the PMC archive, if in block 225, search routine 200 obtained the search term "malaria", then in subroutine block 600, search routine 200 may identify a set of related nouns such as 'drug', 'antigen', 'reagent', 'virus', 'gene', 'protein', 'cell', 'disease', and 'bacteria', each of which are strongly associated with the term "malaria" within the corpus.

In various embodiments, such related nouns may be used to categorize and/or filter search results. In some embodiments, such related nouns may be presented to the searching user (e.g., using a tag-cloud interface) such that the user may indicate and/or promote particular related nouns that he or she believes are most relevant. In some embodiments, such user feedback may be incorporated into subsequent searches for similar terms.

Beginning in opening loop block 235, search routine 200 processes each related noun in turn.

In block 240, search routine 200 selects from said corpus texts in which the search term and the related noun appear near each other in at least one place. For example, in the example embodiment based on a corpus of texts from the PMC archive, when processing the search term 'malaria' and the related noun 'drug', search routine 200 may select texts having identifiers such as the following:

BMC_Public_Health_2011_Mar_4_11(Suppl_2)_S9;
BMC_Public_Health_2009_Jul_23_9_259;
BMC_Infect_Dis_2001_Aug_14_1_10;
BMC_Public_Health_2009_Mar_23_9_85;
Malar_J_2008_Feb_26_7_35; and
Malar_J_2013_May_24_12_168.

Using the text 'BMC_Public_Health_2011_Mar_4_11 (Suppl_2)_S9' as an example, the search term ("malaria") and the related noun ("drug) may appear near each other in two places.

More specifically, the search term and the related noun (part of the noun phrase 'Malaria Drug Resistance MDR') may appear near each other in one place as illustrated in the following contextual snippet:

Specifically, the phenomena of CQ and S/P resistant *P. falciparum* are well described in Africa and been demonstrated to have spread from Southeast Asia to Africa in so-called "selective sweeps", suggesting that history may repeat itself with the newly discovered artemisinin resistance phenomenon in Southeast Asia. The Malaria Drug Resistance (MDR) laboratory of the U. S. Army Medical Research Unit—Kenya (USAMRU-K), based in Kisumu, in collaboration with the Kenya Medical Research Institute and Kenya Ministry of Health, has monitored in vitro malaria drug sensitivity and molecular marker profiles across Kenya since 1995. In 2009, *P. falciparum* drug resistance surveillance efforts focused in western Kenya at three district hospitals in Kisumu, Kericho, and Kisii.

Similarly, the search term and the related noun (part of the noun phrase 'common malaria drug') may appear near each other in one place as illustrated in the following contextual snippet:

This underscores the threat posed by emerging drug resistance and the importance of effective surveillance systems to detect the onset of resistance and assure optimal treatments. In 2009, the AFHSC-GEIS laboratory network analyzed 19,730 specimens from 25 sites spanning malaria-endemic regions using techniques, such as molecular characterization of resistance genes and in vitro drug sensitivity assays to determine inhibitory concentrations against a battery of common malaria drugs. Some sites are also capable of conducting therapeutic efficacy and complex pharmacokinetic in vivo studies to better understand drug-parasite interactions.

In subroutine block 700, search routine 200 provides data associated with said plurality of selected texts for presentation as search results. For example, in one embodiment, search routine 200 may provide data from which a portion of an interface such as search-results user-interface 900 (see FIG. 9, discussed below), ResultsUITwoItem/_figbelow, and/or search-results user-interface 1000 (see FIG. 10, discussed below) may be presented to the user.

In ending loop block 250, search routine 200 iterates back to opening loop block 235 to process the next related noun, if any.

Search routine 200 ends in ending block 299.

Figure 3:
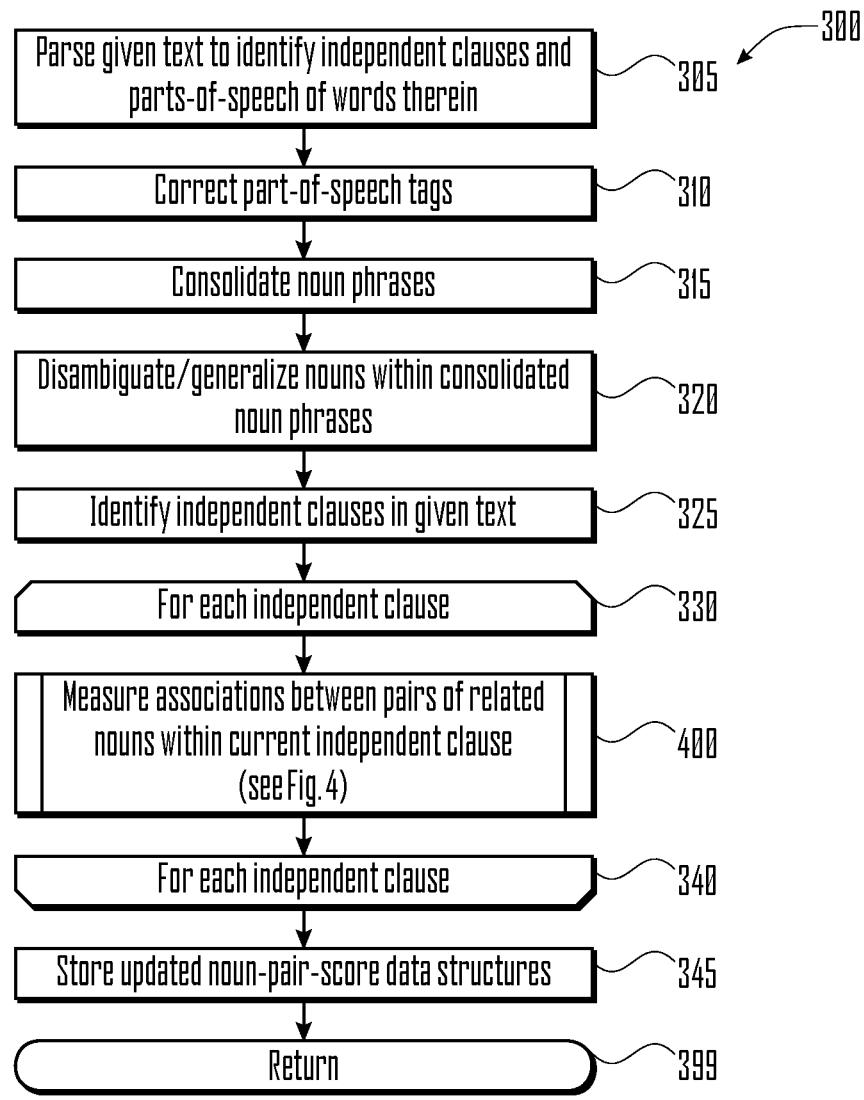
FIG. 3 illustrates a proximity-score subroutine for measuring associations between nouns that appear in a given text, such as may be performed by a search-service server in accordance with one embodiment.

FIG. 3 illustrates a proximity-score subroutine 300 for measuring associations between nouns that appear in a given text, such as may be performed by a search-service server 1100 in accordance with one embodiment.

In block 305, proximity-score subroutine 300 parses the given text to identify the independent clauses making up the text, and to tag individual words according to their possible parts of speech. In some embodiments, proximity-score subroutine 300 may employ a general-purpose NLP package for such purposes. In one embodiment, proximity-score subroutine 300 may employ a NLP package such as the Stanford CoreNLP package, provided by The Stanford Natural Language Processing Group at Stanford University or Stanford, Calif., or components thereof. In other embodiments, other NLP packages and/or components may be employed to perform tasks such as tokenization and sentence splitting, part-of-speech tagging, statistical parsing, and the like.

For example, in one embodiment proximity-score subroutine 300 may employ suitable NLP software to process a portion of a text, such as the following example sentence.

This is the case for *Anopheles atroparvus*, the primary vector of human malaria in Spain in the past, which has recently been incriminated in a case of autochthonous malaria transmission, and different *Culex* species involved in the transmission of avian malaria and West Nile and Usutu virus.

In one embodiment, a NLP parsing component may in block 305 produce tagged output similar to the following, which annotates each word or token with a part-of-speech tag such as "NN", which indicates that the annotated word is a "Noun, singular or mass"; "VBP", which indicates that the annotated word is a "Verb, non-3rd person singular present"; and the like.

This/DT is/VBZ the/DT case/NN for/IN *Anopheles*/NNP *atroparvus*/NN,/, the/DT primary/JJ vector/NN of/IN human/JJ malaria/NN in/IN Spain/NNP in/IN the/DT past/NN,/, which/WDT has/VBZ recently/RB been/VBN incriminated/VBN in/IN a/DT case/NN of/IN autochthonous/JJ malaria/NN transmission/NN,/, and/CC different/JJ *Culex*/JJ species/NNS involved/VBN in/IN the/DT transmission/NN of/IN avian/JJ malaria/NN and/CC West/NNP Nile/NNP and/CC Usutu/NNP virus/NN.

The same tagged sentence may be equivalently represented as a data structure such as the following.
{word: This, tag: Determiner}
{word: is, tag: "Verb, 3rd person singular present"}
{word: the, tag: Determiner}
{word: case, tag: "Noun, singular or mass"}
{word: for, tag: Preposition or subordinating conjunction}
{word: *Anopheles*, tag: "Proper noun, singular"}
{word: *atroparvus*, tag: "Noun, singular or mass"}
{word: ",", tag: ","}
{word: the, tag: Determiner}
{word: primary, tag: Adjective}
{word: vector, tag: "Noun, singular or mass"}
{word: of, tag: Preposition or subordinating conjunction}
{word: human, tag: Adjective}
{word: malaria, tag: "Noun, singular or mass"}
{word: in, tag: Preposition or subordinating conjunction}
{word: Spain, tag: "Proper noun, singular"}
{word: in, tag: Preposition or subordinating conjunction}
{word: the, tag: Determiner}
{word: past, tag: "Noun, singular or mass"}
{word: ",", tag: ","}
{word: which, tag: "Wh-determiner"}
{word: has, tag: "Verb, 3rd person singular present"}
{word: recently, tag: Adverb}
{word: been, tag: "Verb, past participle"}
{word: incriminated, tag: "Verb, past participle"}
{word: in, tag: Preposition or subordinating conjunction}
{word: a, tag: Determiner}
{word: case, tag: "Noun, singular or mass"}
{word: of, tag: Preposition or subordinating conjunction}
{word: autochthonous, tag: Adjective}
{word: malaria, tag: "Noun, singular or mass"}
{word: transmission, tag: "Noun, singular or mass"}
{word: ",", tag: ","}
{word: and, tag: Coordinating conjunction}
{word: different, tag: Adjective}
{word: *Culex*, tag: Adjective}
{word: species, tag: "Noun, plural"}
{word: involved, tag: "Verb, past participle"}
{word: in, tag: Preposition or subordinating conjunction}
{word: the, tag: Determiner}
{word: transmission, tag: "Noun, singular or mass"}
{word: of, tag: Preposition or subordinating conjunction}
{word: avian, tag: Adjective}
{word: malaria, tag: "Noun, singular or mass"}
{word: and, tag: Coordinating conjunction}
{word: West, tag: "Proper noun, singular"}
{word: Nile, tag: "Proper noun, singular"}
{word: and, tag: Coordinating conjunction}
{word: Usutu, tag: "Proper noun, singular"}
{word: virus, tag: "Noun, singular or mass"}

To facilitate human comprehension, this and other example data objects depicted herein are presented according to version 1.2 of the YAML "human friendly data serialization standard", specified at http://www.yaml.org/spec/1.2/spec.html. In practice, data objects may be represented internally by any suitable data structure, not necessarily the exact data structure used herein for explanatory purposes. Similarly, in practice, data object may be serialized for storage, processing, and/or transmission into any suitable format (e.g., YAML, JSON, XML, BSON, Property Lists, or the like).

In block 310, proximity-score subroutine 300 uses one or more domain-of-knowledge-specific heuristics to correct the part-of-speech tags that were determined in block 305.

For example, in one embodiment, within a biomedical and/or life sciences domain of knowledge, proximity-score subroutine 300 may employ one or more heuristics to determine that the following words were incorrectly tagged in the above example.

atroparvus:
_original: "Noun, singular or mass"
corrected: "Proper noun, singular"
autochthonous:
_original: Adjective
corrected: "Proper noun, singular"

*Culex:*
   _original: Adjective
   corrected: "Proper noun, singular"
malaria:
   _original: "Noun, singular or mass"
   corrected: "Proper noun, singular"
transmission:
   _original: "Noun, singular or mass"
   corrected: "Proper noun, singular"
   following: malaria
virus:
   _original: "Noun, singular or mass"
   corrected: "Proper noun, singular"
   following: Usutu In other words, in one embodiment, proximity-score subroutine 300 may determine, among other things, that in the example sentence, the word '*Culex*' is not an 'Adjective', but should in context be tagged as a 'Proper noun, singular'.

Similarly, in one embodiment, proximity-score subroutine 300 may determine that in the example sentence, the word 'virus' is not a 'Noun, singular or mass', but should in context be tagged as a 'Proper noun, singular' when 'virus' appears in the phrase 'Usutu virus'.

Once such corrections are made, the corrected tagged sentence may resemble a data structure similar to the following.

{word: This, tag: Determiner}
   {word: is, tag: "Verb, 3rd person singular present"}
   {word: the, tag: Determiner}
   {word: case, tag: "Noun, singular or mass"}
   {word: for, tag: Preposition or subordinating conjunction}
   {word: *Anopheles*, tag: "Proper noun, singular"}
   {word: *atroparvus*, tag: "Proper noun, singular"}
   {word: ",", tag: ","}
   {word: the, tag: Determiner}
   {word: primary, tag: Adjective}
   {word: vector, tag: "Noun, singular or mass"}
   {word: of, tag: Preposition or subordinating conjunction}
   {word: human, tag: Adjective}
   {word: malaria, tag: "Proper noun, singular"}
   {word: in, tag: Preposition or subordinating conjunction}
   {word: Spain, tag: "Proper noun, singular"}
   {word: in, tag: Preposition or subordinating conjunction}
   {word: the, tag: Determiner}
   {word: past, tag: "Noun, singular or mass"}
   {word: ",", tag: ","}
   {word: which, tag: "Wh-determiner"}
   {word: has, tag: "Verb, 3rd person singular present"}
   {word: recently, tag: Adverb}
   {word: been, tag: "Verb, past participle"}
   {word: incriminated, tag: "Verb, past participle"}
   {word: in, tag: Preposition or subordinating conjunction}
   {word: a, tag: Determiner}
   {word: case, tag: "Noun, singular or mass"}
   {word: of, tag: Preposition or subordinating conjunction}
   {word: autochthonous, tag: "Proper noun, singular"}
   {word: malaria, tag: "Proper noun, singular"}
   {word: transmission, tag: "Proper noun, singular"}
   {word: ",", tag: ","}
   {word: and, tag: Coordinating conjunction}
   {word: different, tag: Adjective}
   {word: *Culex*, tag: "Proper noun, singular"}
   {word: species, tag: "Noun, plural"}
   {word: involved, tag: "Verb, past participle"}
   {word: in, tag: Preposition or subordinating conjunction}
   {word: the, tag: Determiner}
   {word: transmission, tag: "Noun, singular or mass"}
   {word: of, tag: Preposition or subordinating conjunction}
   {word: avian, tag: Adjective}
   {word: malaria, tag: "Proper noun, singular"}
   {word: and, tag: Coordinating conjunction}
   {word: West, tag: "Proper noun, singular"}
   {word: Nile, tag: "Proper noun, singular"}
   {word: and, tag: Coordinating conjunction}
   {word: Usutu, tag: "Proper noun, singular"}
   {word: virus, tag: "Proper noun, singular"}

In block 315, proximity-score subroutine 300 consolidates noun phrases among the tagged words corrected in block 310. For example, in one embodiment, proximity-score subroutine 300 may process a data structure such as that shown above to identify a set of noun phrases, each comprising a set of one or more nouns, such as the following.

[case, *Anopheles, atroparvus*]
[vector, malaria, Spain, past]
[case, autochthonous, malaria, transmission]
[*Culex*, species, involved, transmission, malaria]
[West, Nile]
[Usutu, virus]

In one embodiment, such a set of noun phrases may be determined by operating on a data structure such as the exemplary corrected tagged sentence (above) using a process similar to the following greatly simplified process.

```
nounPhrase = [ ]
nounPhrases = [nounPhrase]
for {word, tag} in correctedSentence
  switch tag[0. .3]
    when "Noun", "Prop" # noun or Proper noun
      nounPhrase.push provisionalVerb if provisionalVerb?
      provisionalVerb = null
      nounPhrase.push word
    when "Verb"
      provisionalVerb = word if nounPhrase.length > 0
    when "Prep", "Adje", "Dete" # preposition, adjective, determiner
      continue
    else
      provisionalVerb = null
      if nounPhrase.length > 0
        nounPhrase = [ ]
        nounPhrases.push nounPhrase
```

The above code-snippet conforms to the syntax of and is operable when compiled by version 1.7.1 of the Coffeescript programming language.

In block 320, proximity-score subroutine 300 disambiguates and/or generalizes one or more nouns within one or more of the consolidated noun phrases determined in block 315. In some embodiments, proximity-score subroutine 300 may employ a lexical database for the language in which the texts are written (e.g., English). Such a lexical database may, among other things, group words into sets of synonyms, called synsets, and record various semantic relations between these synsets.

In one embodiment, proximity-score subroutine 300 may employ the WordNet lexical database, provided by the Cognitive Science Laboratory at Princeton University or Princeton, N.J. In such an embodiment, proximity-score subroutine 300 may in block 320 determine, among other things, that in the set of noun phrases shown above, the word 'transmission' is synonymous with the word 'infection'.

Similarly, in such an embodiment, proximity-score subroutine 300 may determine that the lemma or base form of the verb 'involved' is 'involve'. Consequently, proximity-score subroutine 300 may modify the set of noun phrases to include data resembling the following.

[case, *Anopheles, atroparvus*]
[vector, malaria, Spain, past]
[case, autochthonous, malaria, "transmission|infection"]
[*Culex*, species, involve, "transmission|infection", malaria]
[West, Nile]
[Usutu, virus]

In block 325, proximity-score subroutine 300 uses an NLP sentence splitter or similar logic to identify independent clauses in the given text.

Beginning in opening loop block 330, proximity-score subroutine 300 processes each independent clause in turn.

In subroutine block 400, proximity-score subroutine 300 calls subroutine 400 (see FIG. 4, discussed below) to measure associations between pairs of related nouns within the current independent clause.

In ending loop block 340, proximity-score subroutine 300 iterates back to opening loop block 330 to process the next independent clause, if any.

In block 345, proximity-score subroutine 300 stores, e.g., in corpus-data database 1140, noun-pair-score data structures corresponding to the given text that were updated in iterations of subroutine block 400. For example, in one embodiment when processing the noun-pairs case . . . *Anopheles*, case . . . *atroparvus*, case . . . vector, case . . . malaria, case . . . spain, and case . . . past in the context of the example sentence, proximity-score subroutine 300 may store data similar to some or all of the following.

wordPair: case . . . *Anopheles*
      score: 0.6
      snippets:
        the case for *Anopheles atroparvus*
        document: Malar_J_2008_Feb_26_7_35
    wordPair: case . . . *atroparvus*
      score: 0.6
      snippets:
        "the case for *Anopheles atroparvus*, the"
        document: Malar_J_2008_Feb_26_7_35
    wordPair: case . . . vector
      score: 0.6
      snippets:
        "the case for *Anopheles atroparvus*, the primary vector of"
        document: Malar_J_2008_Feb_26_7_35
    wordPair: case . . . malaria
      score: 0.9
      snippets:
        "the case for *Anopheles atroparvus*, the primary vector of human malaria in"
        a case of autochthonous malaria transmission
        document: Malar_J_2008_Feb_26_7_35
    wordPair: case_spain
      score: 0.3
      snippets:
        "the case for *Anopheles atroparvus*, the primary vector of human malaria in Spain in"
        document: Malar_J_2008_Feb_26_7_35
    wordPair: case . . . past
      score: 0.3
      snippets:
        "the case for *Anopheles atroparvus*, the primary vector of human malaria in Spain in the past, which"
        document: Malar_J_2008_Feb_26_7_35

In many embodiments, proximity-score subroutine 300 may store longer contextual snippets than those illustrated above.

Subsequently, the updated measures of intra-clause proximity for the given text may be used to facilitate identifying nouns that are related to a search term and identifying the given text as being related (or not) to a given search term.

Proximity-score subroutine 300 ends in ending block 399, returning to the caller.

Figure 4:
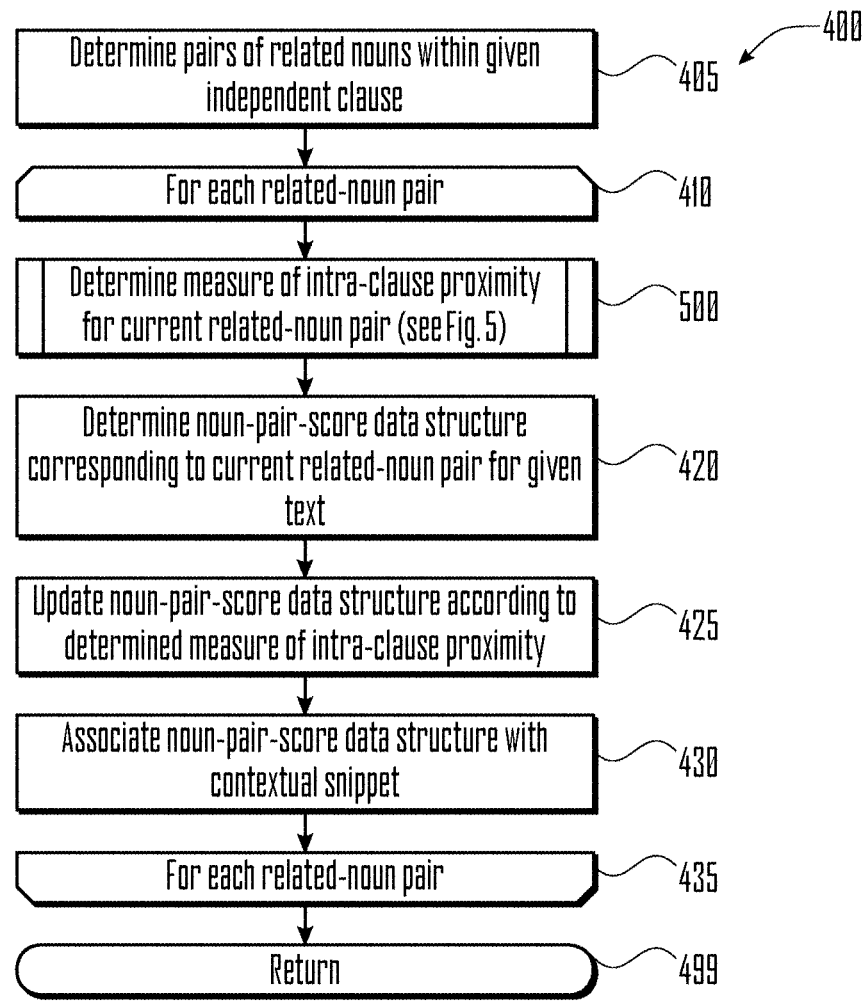
FIG. 4 illustrates an independent-clause-processing subroutine for measuring associations between nouns that appear in a given independent clause of a given text, such as may be performed by a search-service server in accordance with one embodiment.

FIG. 4 illustrates an independent-clause-processing subroutine 400 for measuring associations between nouns that appear in a given independent clause of a given text, such as may be performed by a search-service server 1100 in accordance with one embodiment.

In block 405, independent-clause-processing subroutine 400 determines pairs of related nouns within the given independent clause. For example, in one embodiment, each noun within each of the noun phrases determined above may be determined to be related to each noun that appears subsequently in the same independent clause. For example, in the example set of noun phrases shown above, independent-clause-processing subroutine 400 may determine a set of related-noun pairs including pairs similar to the following (in which two out of every three pairs have been omitted for brevity).

case . . . *Anopheles*
    case . . . malaria
    case . . . autochthonous
    case . . . species
    case . . . Ni to
    *Anopheles* . . . *atroparvus*
    *Anopheles* . . . Spain
    *Anopheles* . . . autochthonous
    *Anopheles* . . . species
    *Anopheles* . . . Nile
    *atroparvus* . . . vector
    *atroparvus* . . . past
    "*atroparvus* . . . (transmission|infection)"
    *atroparvus* . . . involve
    *atroparvus* . . . Usutu
    vector . . . Spain
    vector . . . autochthonous
    vector . . . species
    vector . . . Nile
    malaria . . . Spain
    malaria . . . autochthonous
    malaria . . . species
    Spain . . . past
    Spain . . . malaria
    Spain . . . species
    past . . . case
    "past . . . (transmission|infection)"
    past . . . involve
    past . . . Usutu
    "autochthonous . . . (transmission|infection)"
    autochthonous . . . involve
    autochthonous . . . Usutu
    "(transmission|infection) . . . species"
    "(transmission|infection) . . . West"
    "(transmission|infection) . . . virus"
    "*Culex* . . . (transmission|infection)"
    *Culex* . . . Nile
    species . . . involve
    species . . . West
    species . . . virus
    involve . . . West
    involve . . . virus
    West . . . virus
    Usutu . . . virus Beginning in opening loop block 410, independent-clause-processing subroutine 400 processes each related-noun pair in turn.

In subroutine block 500, independent-clause-processing subroutine 400 calls subroutine 500 (see FIG. 5, discussed below) to determine a measure of intra-clause proximity for the current related-noun pair. In some embodiments, a measure of intra-clause proximity indicates the strength and/or degree of association between the two nouns of the current related-noun pair in the given independent clause, considering factors such as the word-distance between the two nouns and/or the presence of intervening prepositions or other linking words. In one embodiment, a measure of intra-clause proximity may range from 0 (indicating that two nouns do not appear in the same independent clause) to 1 (indicating that the two nouns are immediately adjacent in an independent clause). Between those extremes, there may be intermediate values indicating that the two terms are either not linked (e.g. 0.3) or linked (e.g., 0.6) by an intervening preposition or other linking word. In other embodiments, other suitable scoring schemes may be equivalently employed.

For example, in one embodiment, when processing a noun-pair consisting of the words '*Anopheles*' and '*atroparvus*', subroutine 500 may return a score of 1 because the members of the pair are adjacent to each other in the snippet ' . . . for *Anopheles atroparvus*, the . . . '.

Similarly, when processing a noun-pair consisting of the words 'case' and '*Anopheles*', subroutine 500 may return a score of 0.6 because the members of the pair are linked to each other by a linking preposition in the snippet . . . the case for *Anopheles atroparvus* . . . '.

For another example, when processing a noun-pair consisting of the words 'autochthonous' and 'species', subroutine 500 may return a score of 0.3 because the members of the pair are neither adjacent nor linked to each other in the snippet ' . . . of autochthonous malaria transmission, and different *Culex* species involved . . . '.

Relatedly, when processing a noun-pair consisting of the words 'case' and 'malaria', subroutine 500 may return a score of 0.9 because the members of the pair have a weak relation in one snippet and a linking relationship in another snippet, namely ' . . . the case for *Anopheles atroparvus*, the primary vector of human malaria in . . . ' and ' . . . a case of autochthonous malaria transmission . . . '.

In block 420, independent-clause-processing subroutine 400 determines a noun-pair-score data structure corresponding to the current related-noun pair for the given text. In many cases, the current related-noun pair may also exist in other previously-processed independent clauses elsewhere in the given text. In such cases, a noun-pair-score data structure corresponding to the current related-noun pair may already exist, in which case, independent-clause-processing subroutine 400 identifies and obtains the existing noun-pair-score data structure. Otherwise, if independent-clause-processing subroutine 400 has not previously encountered the current related-noun pair in the given text, independent-clause-processing subroutine 400 may initialize a new noun-pair-score data structure for the current related-noun pair in the given text.

In various embodiments, a noun-pair-score data structure may include data slots for identifying the members of the current related-noun pair, for indicating a measure of intra-clause proximity, and for providing context for places in which the current related-noun pair appears in the given text.

In block 425, independent-clause-processing subroutine 400 updates the noun-pair-score data structure determined in block 420 according to the measure of intra-clause proximity determined in subroutine block 500.

In block 430, independent-clause-processing subroutine 400 associates the noun-pair-score data structure with a contextual snippet providing context from the independent clause in the given text in which the nouns of the current related-noun pair appear together. In some embodiments, a contextual snippet may include the sentence in which the nouns appear, as well as zero or more surrounding sentences.

In block 435, independent-clause-processing subroutine 400 for each related-noun-pair.

Independent-clause-processing subroutine 400 ends in ending block 499, returning to the caller.

Figure 5:
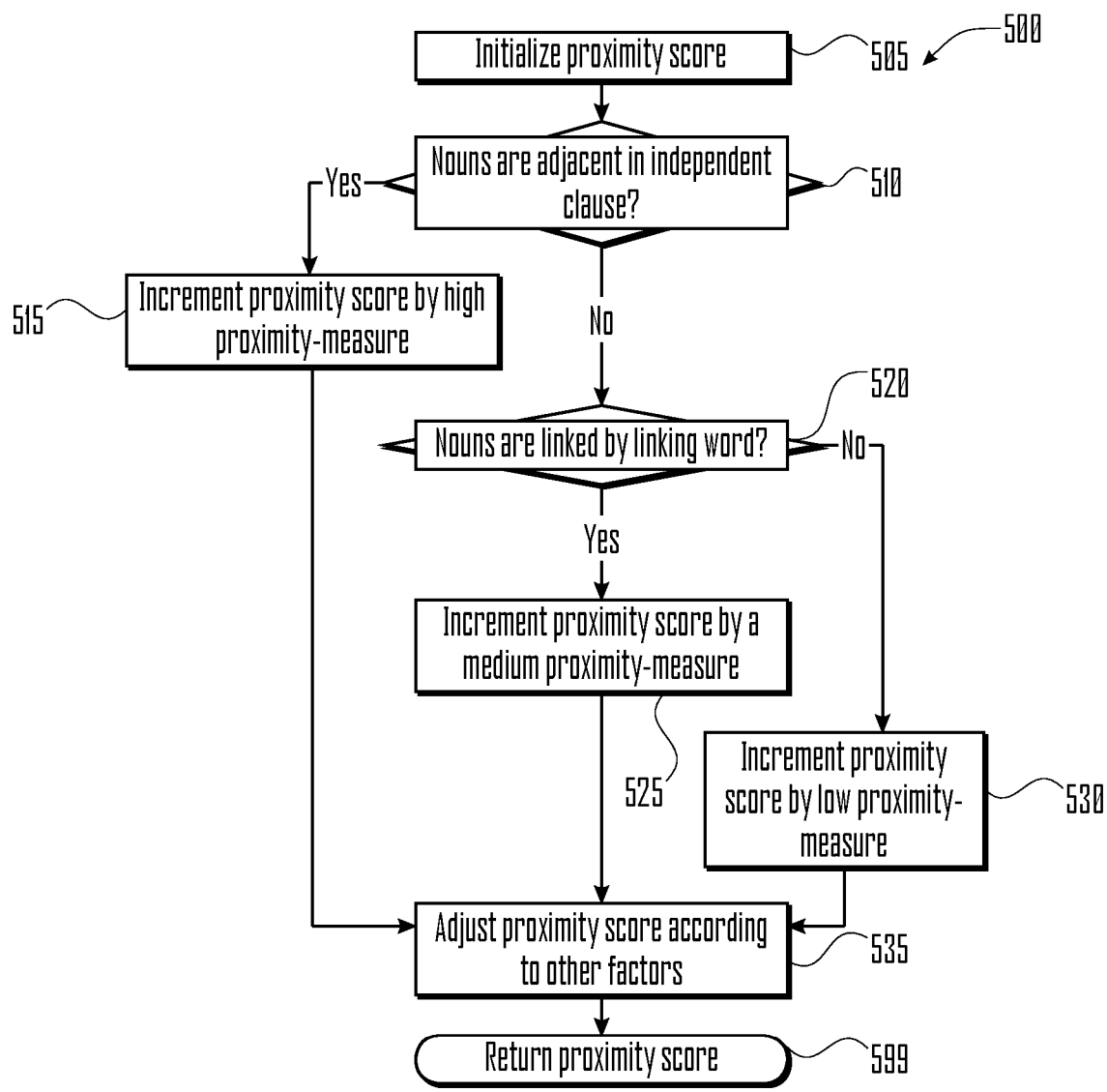
FIG. 5 illustrates a scoring subroutine for determining a measure of intra-clause proximity based on given relationships between a given pair of nouns in a given independent clause, such as may be performed by a search-service server in accordance with one embodiment.

FIG. 5 illustrates a scoring subroutine 500 for determining a measure of intra-clause proximity based on given relationships between a given pair of nouns in a given independent clause, such as may be performed by a search-service server 1100 in accordance with one embodiment.

As discussed further below, unlike many search engines, scoring subroutine 500 does not consider prepositions and other linking words to be 'stop words' that should be excluded and/or ignored. Rather, as discussed below, scoring subroutine 500 uses such linking words to signal a relationship between certain nouns.

In block 505, scoring subroutine 500 initializes a proximity score data structure to an initial value (e.g. 0).

In decision block 510, scoring subroutine 500 determines whether the nouns are adjacent or nearly adjacent in independent clause. If so, then scoring subroutine 500 proceeds to block 515; otherwise, scoring subroutine 500 proceeds to decision block 520.

For example, in one embodiment, when the given pair of nouns includes '*Anopheles*' and '*atroparvus*', subroutine 500 may determine that the members of the pair are adjacent to each other in the snippet ' . . . for *Anopheles atroparvus*, the . . . '.

In block 515, scoring subroutine 500 increments the proximity score by a high proximity-measure. For example, in one embodiment, when the given pair of nouns includes the words '*Anopheles*' and '*atroparvus*', subroutine 500 may increment the proximity score by 1. In other embodiments, scoring subroutine 500 may increment the proximity score by a different value to indicate a high proximity-measure.

In decision block 520, scoring subroutine 500 determines whether the nouns are linked by linking word. If so, then scoring subroutine 500 proceeds to block 525; otherwise, scoring subroutine 500 proceeds to block 530.

For example, in one embodiment, when the given pair of nouns includes 'case' and '*Anopheles*', subroutine 500 may determine that the members of the pair are linked to each other by a linking preposition in the snippet ' . . . the case for *Anopheles atroparvus* . . . '.

In block 525, scoring subroutine 500 increment proximity score by a medium proximity-measure. For example, in one embodiment, when the given pair of nouns includes the words 'case' and '*Anopheles*', subroutine 500 may increment the proximity score by 0.6. In other embodiments, scoring subroutine 500 may increment the proximity score by a different value to indicate a medium proximity-measure.

When the given pair of nouns are neither adjacent nor linked, in block 530, scoring subroutine 500 increments the proximity score by a low proximity-measure.

For example, in one embodiment, when the given pair of nouns includes 'autochthonous' and 'species', subroutine 500 may determine that the members of the both appear in the snippet ' . . . of autochthonous malaria transmission, and different *Culex* species involved . . . ', but pair are neither adjacent nor linked to each other. Consequently, in block 530, scoring subroutine 500 may increment the proximity score by 0.3. In other embodiments, scoring subroutine 500 may increment the proximity score by a different value to indicate a low proximity-measure.

In block 535, scoring subroutine 500 optionally adjusts the proximity score according to one or more other factors. For example, in some embodiments, a particular term may be determined to be particularly relevant (or irrelevant) to the text in which the given independent clause appears. If so, scoring subroutine 500 may adjust the proximity score in block 535 to reflect that particular relevance (or irrelevance) when the particular term is a member of the given pair of nouns.

In various embodiments, relevance (or irrelevance) may be determined based on editorial input, such as when a user selects or deselects a particular relating term to filter search results.

Alternately, in some embodiments, a statistical model of the distribution of terms in a text may indicate that certain terms relate to the subject of the text. For example, in many texts, the most commonly used English words (e.g., 'the', 'and', and the like) have a very high frequency and therefore describe little about the content of the text. By contrast, proper nouns tend to have a low frequency in a text, and may also describe little about the content of the text. However, terms that appear at the mean of the frequency distribution may be related to the subject of a text. By statistically plotting the Poisson distribution of terms in a text and taking into account the mean, a set of probable subjects and/or categories may be obtained.

In ending block 599, scoring subroutine 500 ends, returning the proximity score to the caller.

Figure 6:
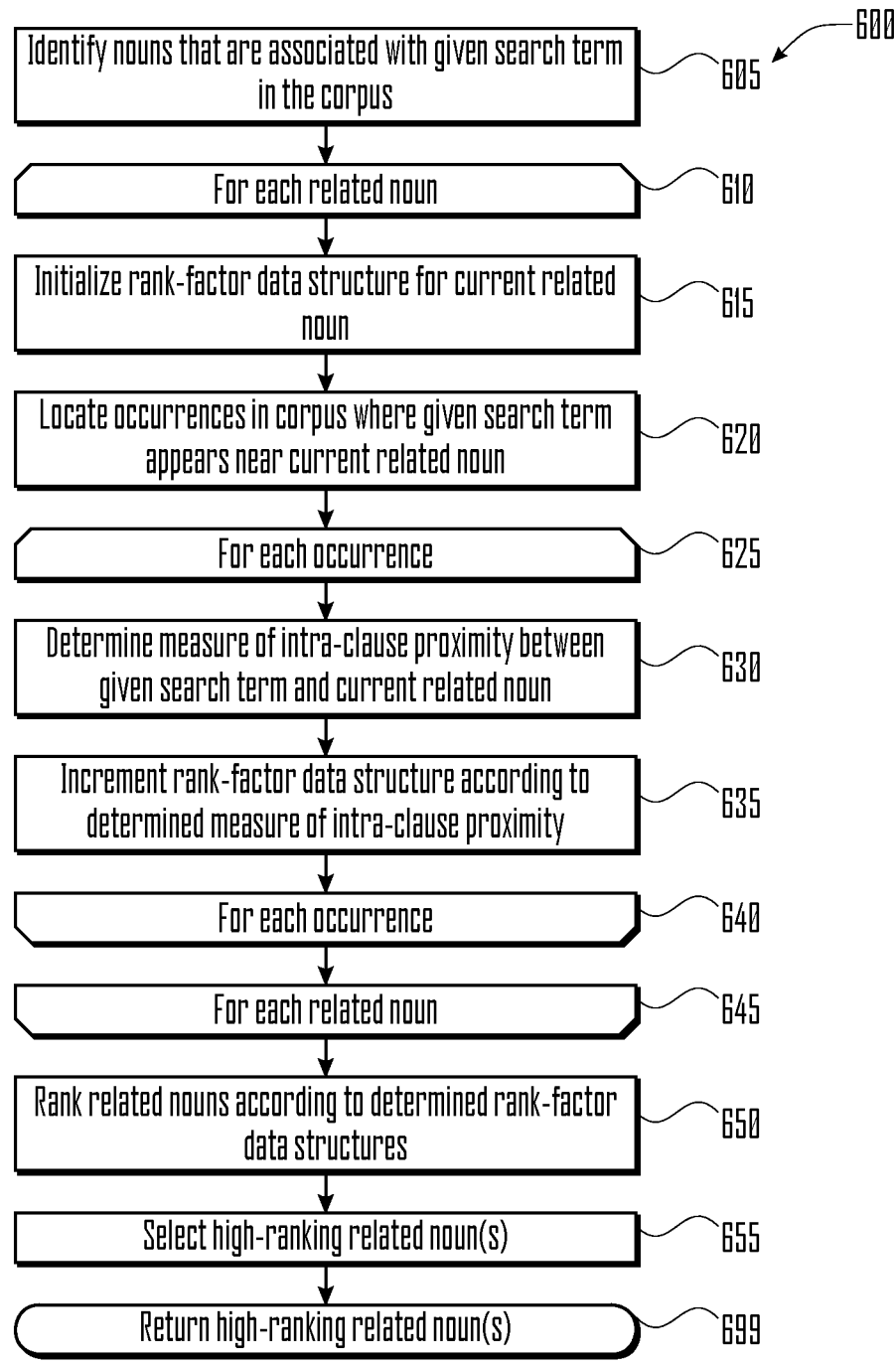
FIG. 6 illustrates a related-term identification subroutine for identifying related noun that are associated with a given search term, such as may be performed by a search-service server in accordance with one embodiment.

FIG. 6 illustrates a related-term identification subroutine 600 for identifying related noun(s) that are associated with a given search term, such as may be performed by a search-service server 1100 in accordance with one embodiment.

Using a data structure describing pairs of nouns that appear in texts of a corpus, in block 605, related-term identification subroutine 600 identifies one or more nouns that are associated with the given search term in one or more texts of the corpus.

For example, in one embodiment, a user may enter a search term such as 'malaria'. Using data similar to that described above in reference to proximity-score subroutine 300 (see FIG. 3, discussed above) and/or independent-clause-processing subroutine 400 (see FIG. 4, discussed above), related-term identification subroutine 600 may determine that 'malaria' appears in at least one text as part of the following related-noun pairs, each term of which appear near each other in at least one place in at least one text.

malaria . . . drug
    malaria . . . antigen
    malaria . . . reagent
    malaria . . . virus
    gene . . . malaria
    protein . . . malaria
    malaria . . . cell
    malaria . . . disease
    bacteria . . . malaria From such related-noun-pair data, related-term identification subroutine 600 may determine that the following nouns are associated with the search term 'malaria' in the corpus: 'drug', 'antigen', 'reagent', 'virus', 'gene', 'protein', 'cell', 'disease', and 'bacteria'.

Beginning in opening loop block 610, related-term identification subroutine 600 processes each related noun in turn.

In block 615, related-term identification subroutine 600 initializes a rank-factor data structure for the current related noun to an initial value (e.g. 0).

In block 620, related-term identification subroutine 600 locates occurrences in one or more texts of the corpus where the given search term appears near the current related noun. For example, using data similar to the noun-pair-score data structures shown in reference to block 345 (see FIG. 3, discussed above), related-teem identification subroutine 600 may determine that the search term and the current related noun occur near each other in one or more places across one or more texts of the corpus.

Beginning in opening loop block 625, related-term identification subroutine 600 processes each occurrence in turn.

In block 630, related-term identification subroutine 600 determines a measure of intra-clause proximity between the given search term and the current related noun. For example, using data similar to the noun-pair-score data structures shown in reference to block 345 (see FIG. 3, discussed above), related-term identification subroutine 600 may determine that a given occurrence of the search term and the current related noun was scored with a certain measure of intra-clause proximity using a scoring process such as that described in reference to independent-clause-processing subroutine 400 (see FIG. 4, discussed above) and/or scoring subroutine 500 (see FIG. 5, discussed above).

In block 635, related-term identification subroutine 600 increments the rank-factor data structure initialized in block 615 according to the measure of intra-clause proximity determined in block 630.

In ending loop block 640, related-term identification subroutine 600 iterates back to opening loop block 625 to process the next occurrence, if any.

In ending loop block 645, related-term identification subroutine 600 iterates back to opening loop block 610 to process the next related noun, if any.

Once cumulative, corpus-wide measures of intra-clause proximity have been accumulated for each related noun in iterations of block 635, in block 650, related-term identification subroutine 600 ranks the related nouns according to the determined rank-factor data structures.

In block 655, related-term identification subroutine 600 selects one or more high-ranking related nouns based at least in part on the ranking performed in block 650.

In ending block 699, related-term identification subroutine 600 ends, returning the one or more high-ranking related noun(s) to the caller.

Figure 7:
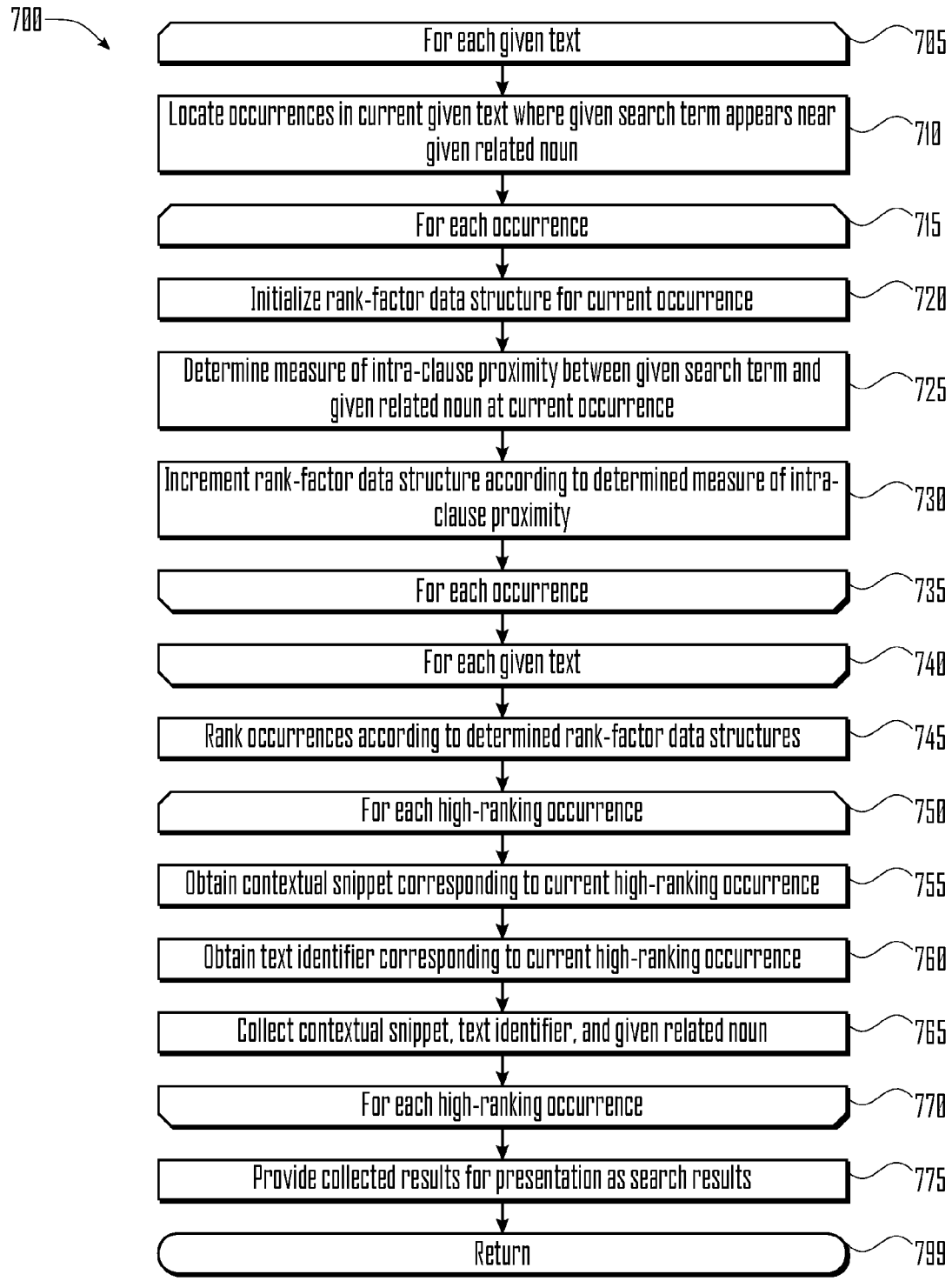
FIG. 7 illustrates a results subroutine for providing, for presentation as search results, data associated with a given text, a given search term, and a given related noun, such as may be performed by a search-service server in accordance with one embodiment.

FIG. 7 illustrates a results subroutine 700 for providing, for presentation as search results, data associated with a given text, a given search term, and a given related noun, such as may be performed by a search-service server 1100 in accordance with one embodiment.

Beginning in opening loop block 705, results subroutine 700 processes each given text in turn.

In block 710, results subroutine 700 locates occurrences in the current given text where the given search term appears near the given related noun. For example, using data similar to the noun-pair-score data structures shown in reference to block 345 (see FIG. 3, discussed above), results subroutine 700 may determine that the given search term and the given related noun occur near each other in one or more places in the given text.

Beginning in opening loop block 715, results subroutine 700 processes each occurrence in turn.

In block 720, results subroutine 700 initializes a rank-factor data structure for the current occurrence to an initial value (e.g. 0).

In block 725, results subroutine 700 determines a measure of intra-clause proximity between the given search term and the given related noun at the current occurrence. For example, using data similar to the noun-pair-score data structures shown in reference to block 345 (see FIG. 3, discussed above), results subroutine 700 may determine that a the current occurrence of the given search term and the given related noun were scored with a certain measure of intra-clause proximity using a scoring process such as that described in reference to independent-clause-processing subroutine 400 (see FIG. 4, discussed above) and/or scoring subroutine 500 (see FIG. 5, discussed above).

In block 730, results subroutine 700 increments the rank-factor data structure initialized in block 720 according to the measure of intra-clause proximity determined in block 725.

In ending loop block 735, results subroutine 700 iterates back to opening loop block 715 to process the next occurrence, if any.

In ending loop block 740, results subroutine 700 iterates back to opening loop block 705 to process the next given text, if any.

In block 745, results subroutine 700 ranks the occurrences according to the rank-factor data structures incremented in iterations of block 730.

Beginning in opening loop block 750, results subroutine 700 processes each high-ranking occurrence in turn.

In block 755, results subroutine 700 obtains a contextual snippet corresponding to the current high-ranking occurrence.

In block 760, results subroutine 700 obtains a text identifier corresponding to the current high-ranking occurrence.

In block 765, results subroutine 700 collects the contextual snippet, the text identifier identifying the text in which the contextual snippet occurs, and the given related noun.

In ending loop block 770, results subroutine 700 iterates back to opening loop block 750 to process the next high-ranking occurrence, if any.

In block 775, results subroutine 700 provides the collected results for presentation as search results.

Results subroutine 700 ends in ending block 799, returning to the caller.

Figure 8:
FIG. 8 illustrates an exemplary search-results user-interface showing three search-results for the search term 'malaria' and the related-noun 'drug', in accordance with one embodiment.

FIG. 8 illustrates an exemplary search-results user-interface 800 showing three search-results for the search term 'malaria' and the related-noun 'drug', in accordance with one embodiment.

Related noun display 805 indicates that the subsequent set of results are clustered and/or categorized according to the related-noun 'drug'.

Score display 810 indicates that the related-noun 'drug' has a cumulative, corpus-wide intra-clause proximity-measure of 294.

Noun phrase display 815 indicates that the current search result includes the related-noun 'drug' as part of the noun phrase, 'Malaria Drug Resistance MDR'.

Contextual snippet display 820 provides the context in which the noun phrase, 'Malaria Drug Resistance MDR', appears in the current search-result text.

Text control 825 includes a link with an identifier identifying the complete text in which the noun phrase, 'Malaria Drug Resistance MDR' appears.

Noun phrase display 830 indicates that the current search result includes the related-noun 'drug' as part of the noun phrase, 'common malaria drug'.

Contextual snippet display 835 provides the context in which the noun phrase, 'common malaria drug', appears in the current search-result text.

Text control 840 includes a link with an identifier identifying the complete text in which the noun phrase, 'common malaria drug' appears.

Noun phrase display 845 indicates that the current search result includes the related-noun 'drug' as part of the noun phrase, 'antimalarial drug'.

Contextual snippet display 850 provides the context in which the noun phrase, 'antimalarial drug', appears in the current search-result text.

Text control 855 includes a link with an identifier identifying the complete text in which the noun phrase, 'antimalarial drug' appears.

Figure 9:
FIG. 9 illustrates an exemplary search-results user-interface showing four search-results for the search term 'malaria' and the related-noun 'reagent', in accordance with one embodiment.

FIG. 9 illustrates an exemplary search-results user-interface 900 showing four search-results for the search term 'malaria' and the related-noun 'reagent', in accordance with one embodiment.

Related noun display 905 indicates that the subsequent set of results are clustered and/or categorized according to the related-noun 'reagent'.

Score display 910 indicates that the related-noun 'reagent' has a cumulative, corpus-wide intra-clause proximity-measure of 257.

Noun phrase display 915 indicates that the current search result includes the related-noun 'reagent' as part of the noun phrase, 'Reference Reagent Resource Center MR4'.

Contextual snippet display 920 provides the context in which the noun phrase, 'Reference Reagent Resource Center MR4', appears in the current search-result text.

Text control 925 includes a link with an identifier identifying the complete text in which the noun phrase, 'Reference Reagent Resource Center MR4' appears.

Noun phrase display 930 indicates that the current search result includes the related-noun 'reagent' as part of the noun phrase, 'Reference Reagent Resource Center MR4'.

Contextual snippet display 935 provides the context in which the noun phrase, 'Reference Reagent Resource Center MR4', appears in the current search-result text.

Text control 940 includes a link with an identifier identifying the complete text in which the noun phrase, 'Reference Reagent Resource Center MR4' appears.

Noun phrase display 945 indicates that the current search result includes the related-noun 'reagent' as part of the noun phrase, 'Reference Reagent Resource Center MR4'.

Contextual snippet display 950 provides the context in which the noun phrase, 'Reference Reagent Resource Center MR4', appears in the current search-result text.

Text control 955 includes a link with an identifier identifying the complete text in which the noun phrase, 'Reference Reagent Resource Center MR4' appears.

Noun phrase display 960 indicates that the current search result includes the related-noun 'reagent' as part of the noun phrase, 'Malaria Research Reference Reagent Resource Center MR4'.

Contextual snippet display 965 provides the context in which the noun phrase, 'Malaria Research Reference Reagent Resource Center MR4', appears in the current search-result text.

Figure 10:
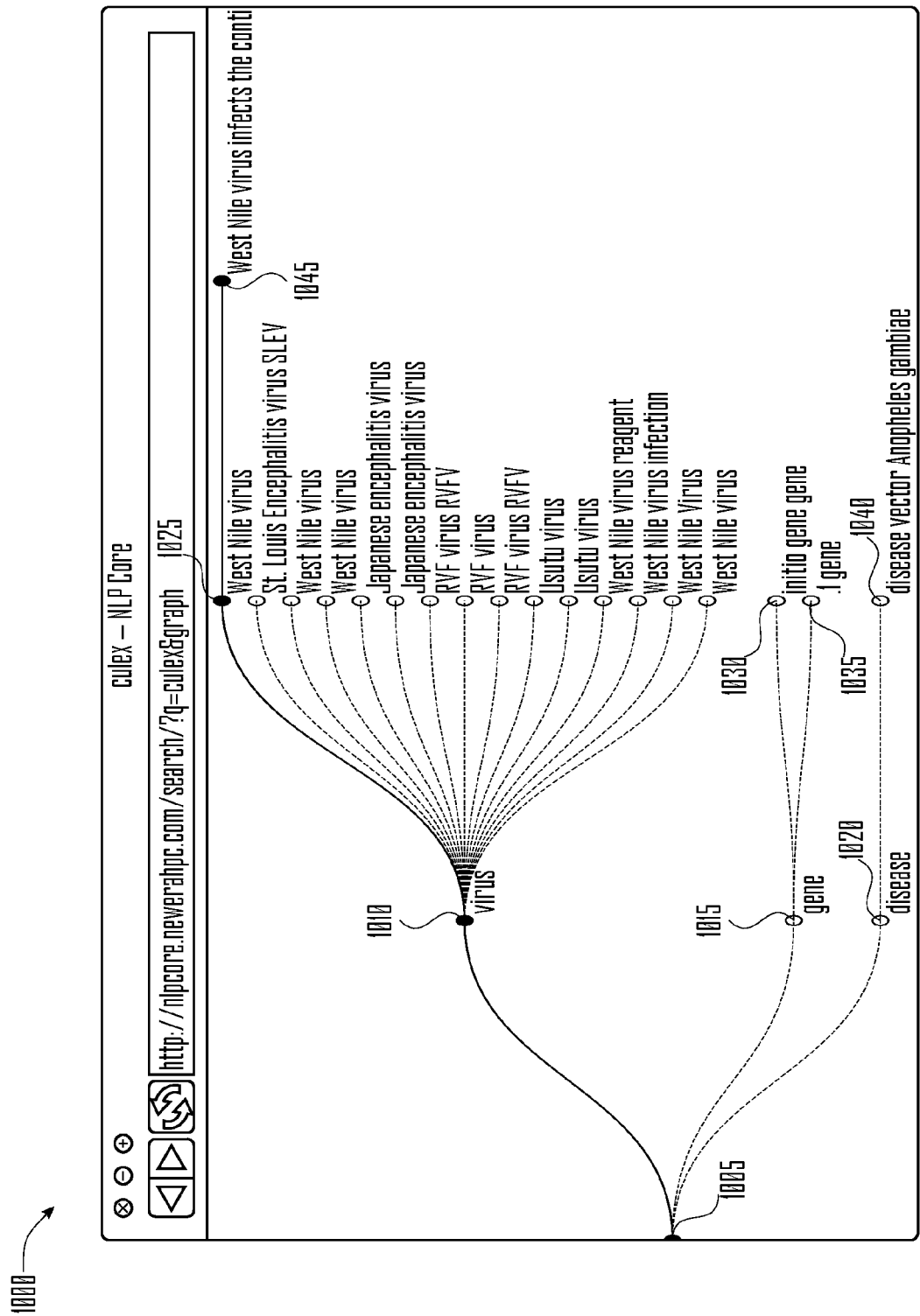
FIG. 10 illustrates an exemplary alternative, graph-based search-results user-interface showing search-results related to the search term '*culex*', in accordance with one embodiment.

FIG. 10 illustrates an exemplary alternative, graph-based search-results user-interface 1000 showing search-results related to the search term '*culex*', in accordance with one embodiment.

Results 1005 represents a root node for all search-results related to the search teem '*culex*' in a corpus.

Selected category node 1010 represents a category or cluster of one or more search-results in which the search term '*culex*' appears near the related noun 'virus'. In the illustrated search-results user-interface 1000, the cluster of search-results includes 15 results in which the related noun 'virus' appears in a text as part of one of the noun phrases, 'West Nile virus', 'St. Louis Encephalitis virus SLEV', 'Japanese encephalitis virus', 'RVF virus RVFV', 'RVF virus', 'Usutu virus', 'West Nile virus reagent', or 'West Nile virus infection'.

Unselected category node 1015 represents a category or cluster of one or more search-results in which the search term '*culex*' appears near the related noun 'gene'.

Unselected category node 1020 represents a category or cluster of one or more search-results in which the search term '*culex*' appears near the related noun 'disease'.

Selected entity node 1025 represents a search-result (of one or more search-results) in which the related noun 'virus' appears as part of the noun phrase 'West Nile virus'.

Unselected entity node 1030 represents a search-result (of one or more search-results) in which the related noun 'gene' appears as part of the noun phrase 'initio gene'.

Unselected entity node 1035 represents a search-result (of one or more search-results) in which the related noun 'gene' appears as part of the noun phrase '0.1 gene'.

Unselected entity node 1040 represents a search-result (of one or more search-results) in which the related noun 'disease' appears as part of the noun phrase 'disease vector *Anopheles gambiae*'.

Contextual snippet node 1045 depicts a contextual snippet in which the selected noun phrase, 'West Nile virus', appears in a text.

Figure 11:
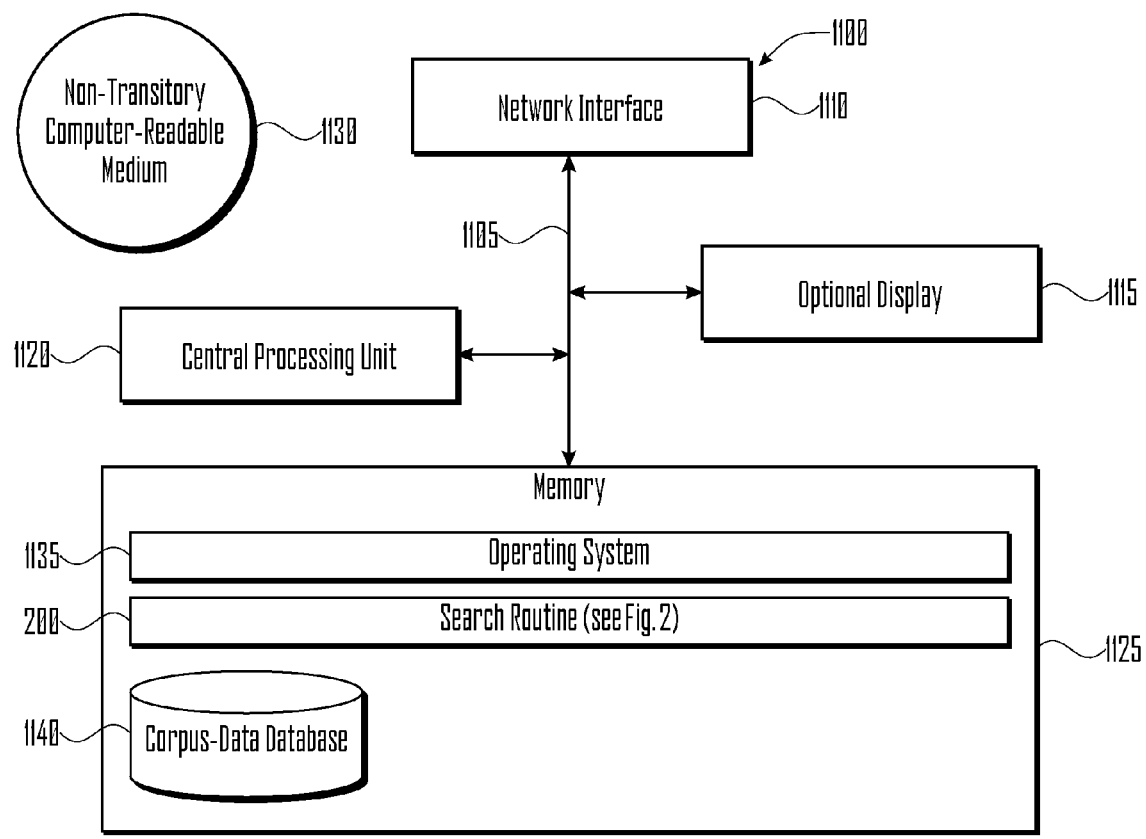
FIG. 11 illustrates several components of an exemplary search-service server in accordance with one embodiment.

FIG. 11 illustrates several components of an exemplary search-service server in accordance with one embodiment. In various embodiments, search-service server 1100 may include a desktop PC, server, workstation, mobile phone, laptop, tablet, set-top box, appliance, or other computing device that is capable of performing operations such as those described herein. In some embodiments, search-service server 1100 may include many more components than those shown in FIG. 11. However, it is not necessary that all of these generally conventional components be shown in order to disclose an illustrative embodiment.

In various embodiments, search-service server 1100 may comprise one or more physical and/or logical devices that collectively provide the functionalities described herein. In some embodiments, search-service server 1100 may comprise one or more replicated and/or distributed physical or logical devices.

In some embodiments, search-service server 1100 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Search-service server 1100 includes a bus 1105 interconnecting several components including a network interface 1110, an optional display 1115, a central processing unit 1120, and a memory 1125.

Memory 1125 generally comprises a random access memory ("RAM") and permanent non-transitory mass storage device, such as a hard disk drive or solid-state drive. Memory 1125 stores program code for a search routine 200 for searching a corpus of texts relating to a domain of knowledge (see FIG. 2, discussed above). In addition, the memory 1125 also stores an operating system 1135.

These and other software components may be loaded into memory 1125 of search-service server 1100 using a drive mechanism (not shown) associated with a non-transitory computer-readable medium 1130, such as a floppy disc, tape, DVD/CD-ROM drive, memory card, or the like.

Memory 1125 also includes corpus-data database 1140. In some embodiments, search-service server 1100 may communicate with corpus-data database 1140 via network interface 1110, a storage area network ("SAN"), a high-speed serial bus, and/or via the other suitable communication technology.

In some embodiments, corpus-data database 1140 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a search service provided by a server to a remote client, in other embodiments, search methods similar to those described herein may be employed locally on a client computer to find and display results within a local or remote corpus.

Similarly, although various embodiments are described above in terms of a search service that enables searching of a corpus of scientific and/or technical articles, other embodiments may use similar techniques to allow searching of a corpus of texts related to a non-technical, but specialized domain of knowledge such as movies, fashion, photography, or the like. This application is intended to cover any adaptations or variations of the embodiments discussed herein.

The invention claimed is:

1. A computer-implemented method for searching a corpus of texts relating to a domain of knowledge, the method comprising:

determining, by said computer, a multiplicity of noun-pair proximity scores measuring associations between pairs of nouns that appear in said corpus of texts and that are semantically related to said domain of knowledge;

obtaining, by said computer, a search term related to said domain of knowledge;

identifying, by said computer based at least in part on said multiplicity of noun-pair proximity scores, a related noun that is strongly associated with said search term within said corpus of texts;

selecting, by said computer, a plurality of texts from said corpus of texts, wherein, in each of said plurality of texts, said search term and said related noun appear near each other in at least one place; and providing, by said computer, data associated with said plurality of texts for presentation as search results; and wherein determining said multiplicity of noun-pair proximity scores comprises, for a given text of said corpus of texts:

parsing said given text to identify an independent clause that appears in said given text and that includes at least a first noun and a second noun;

determining a measure of intra-clause proximity based at least in part on said first noun's relationship to said second noun within said independent clause; and assigning said determined measure of intra-clause proximity to a noun-pair-score data structure corresponding to said first noun and said second noun.

2. The computer-implemented method of claim 1, wherein parsing said given text to identify said independent clause comprises:

parsing said given text using a general-purpose grammatical parser to determine a multiplicity of part-of-speech tags corresponding respectively to a multiplicity of words of said given text; and correcting errors in said multiplicity of part-of-speech tags according to a domain-of-knowledge-specific correction algorithm.

3. The computer-implemented method of claim 1, wherein determining said determined measure of intra-clause proximity comprises:

indicating a high measure when said first noun is adjacent to said second noun within said independent clause;

indicating a medium measure when said first noun is separated from said second noun within said independent clause by a linking word; and otherwise indicating a low measure.

4. The computer-implemented method of claim 1, wherein determining said multiplicity of noun-pair proximity scores further comprises, for a given text of said corpus of texts:

determining a second independent clause that appears in said given text and that includes at least a third noun and a fourth noun;

determining a synonym or hypernym corresponding to said third noun;

determining a second measure of intra-clause proximity based at least in part on said third noun's relationship to said fourth noun within a fourth independent clause; and assigning said second determined measure of intra-clause proximity to a second noun-pair-score data structure corresponding to said synonym or hypernym and said fourth noun.

5. The method of claim 1, wherein identifying said related noun comprises:

identifying a plurality of proximate nouns that appear near said search term in at least some of said texts;

ranking said plurality of proximate nouns based at least in part on ranking factors including how frequently and how proximately each of said plurality of proximate nouns appear in relation to said search term across said at least some of said texts; and selecting a high-ranking one of said plurality of proximate nouns.

6. The computer-implemented method of claim 5, wherein said ranking factors further comprise how statistically likely it is that each of said plurality of proximate nouns relates to a subject of a text in which it appears.

7. The computer-implemented method of claim 1, wherein providing data associated with said plurality of texts comprises:

for each of said plurality of texts, identifying a noun phrase that includes said related noun and that appears in said at least one place; and providing said noun phrase for each of said plurality of texts for presentation as search results.

8. The computer-implemented method of claim 7, further comprising generating a user interface that categorizes said search results into a plurality of categories according to said related noun and one or more other related nouns that are also strongly associated with said search term within said corpus of texts.

9. The computer-implemented method of claim 8, wherein for at least one of said plurality of categories, said user interface sub-categorizes said search results according to said noun phrase and one or more other noun phrases, each of which includes said related noun and appears near said search term in one of said plurality of texts.

10. The computer-implemented method of claim 1, wherein providing data associated with said plurality of texts comprises:

for each of said plurality of texts, obtaining at least one contextual snippet of text surrounding said at least one place, said at least one contextual snippet including said search term and said related noun; and providing said at least one contextual snippet for each of said plurality of texts for presentation as search results.

11. A computing apparatus for searching a corpus of texts relating to a domain of knowledge, the apparatus comprising a processor and a memory storing instructions that, when executed by the processor, configure the apparatus to:

determine a multiplicity of noun-pair proximity scores measuring associations between pairs of nouns that appear in said corpus of texts and that are semantically related to said domain of knowledge;

obtain a search term related to said domain of knowledge;

identify, based at least in part on said multiplicity of noun-pair proximity scores, a related noun that is strongly associated with said search term within said corpus of texts;

select from said corpus of texts a plurality of texts, wherein, in each of said plurality of texts, said search term and said related noun appear near each other in at least one place; and provide data associated with said plurality of texts for presentation as search results, and wherein the instructions that configure the apparatus to determine said multiplicity of noun-pair proximity scores further comprise instructions configuring the apparatus to, for a given text of said corpus of texts:

parse said given text to identify an independent clause that appears in said given text and that includes at least a first noun and a second noun;

determine a measure of intra-clause proximity based at least in part on said first noun's relationship to said second noun within said independent clause; and assign said determined measure of intra-clause proximity to a noun-pair-score data structure corresponding to said first noun and said second noun.

12. The apparatus of claim 11, wherein the instructions that configure the apparatus to parse said given text to identify said independent clause further comprise instructions configuring the apparatus to:

parse said given text using a general-purpose grammatical parser to determine a multiplicity of part-of-speech tags corresponding respectively to a multiplicity of words of said given text; and correct errors in said multiplicity of part-of-speech tags according to a domain-of-knowledge-specific correction algorithm.

13. The apparatus of claim 11, wherein the instructions that configure the apparatus to determine said determined measure of intra-clause proximity further comprise instructions configuring the apparatus to:

indicate a high measure when said first noun is adjacent to said second noun within said independent clause;

indicate a medium measure when said first noun is separated from said second noun within said independent clause by a linking word; and otherwise indicate a low measure.

14. The apparatus of claim 11, wherein the instructions that configure the apparatus to determine said multiplicity of noun-pair proximity scores further comprise instructions configuring the apparatus to, for a given text of said corpus of texts:

determine a second independent clause that appears in said given text and that includes at least a third noun and a fourth noun;

determine a synonym or hypernym corresponding to said third noun;

determine a second measure of intra-clause proximity based at least in part on said third noun's relationship to said fourth noun within a fourth independent clause; and assign said second determined measure of intra-clause proximity to a second noun-pair-score data structure corresponding to said synonym or hypernym and said fourth noun.

15. A non-transitory computer-readable storage medium having stored thereon instructions including instructions that, when executed by a processor, configure the processor to:

determine a multiplicity of noun-pair proximity scores measuring associations between pairs of nouns that appear in texts and that are semantically related to a domain of knowledge;

obtain a search term related to said domain of knowledge;

identify, based at least in part on said multiplicity of noun-pair proximity scores, a related noun that is strongly associated with said search term within a corpus of texts;

select from said corpus of texts a plurality of texts, wherein, in each of said plurality of texts, said search term and said related noun appear near each other in at least one place; and provide data associated with said plurality of texts for presentation as search results, and wherein the instructions that configure the processor to determine said multiplicity of noun-pair proximity scores further comprise instructions configuring the processor to, for a given text of said corpus of texts:

parse said given text to identify an independent clause that appears in said given text and that includes at least a first noun and a second noun;

determine a measure of intra-clause proximity based at least in part on said first noun's relationship to said second noun within said independent clause; and assign said determined measure of intra-clause proximity to a noun-pair-score data structure corresponding to said first noun and said second noun.

16. The non-transitory computer-readable storage medium of claim 15, wherein the instructions that configure the processor to parse said given text to identify said independent clause further comprise instructions configuring the processor to:

parse said given text using a general-purpose grammatical parser to determine a multiplicity of part-of-speech tags corresponding respectively to a multiplicity of words of said given text; and correct errors in said multiplicity of part-of-speech tags according to a domain-of-knowledge-specific correction algorithm.

17. The non-transitory computer-readable storage medium of claim 15, wherein the instructions that configure the processor to determine said determined measure of intra-clause proximity further comprise instructions configuring the processor to:

indicate a high measure when said first noun is adjacent to said second noun within said independent clause;

indicate a medium measure when said first noun is separated from said second noun within said independent clause by a linking word; and otherwise indicate a low measure.

18. The non-transitory computer-readable storage medium of claim 15, wherein the instructions that configure the processor to determine said multiplicity of noun-pair proximity scores further comprise instructions configuring the processor to, for a given text of said corpus of texts:

determine a second independent clause that appears in said given text and that includes at least a third noun and a fourth noun;

determine a synonym or hypernym corresponding to said third noun;

determine a second measure of intra-clause proximity based at least in part on said third noun's relationship to said fourth noun within a fourth independent clause; and assign said second determined measure of intra-clause proximity to a second noun-pair-score data structure corresponding to said synonym or hypernym and said fourth noun.

* * * * *